US008067906B2

(12) United States Patent
Null

(10) Patent No.: US 8,067,906 B2
(45) Date of Patent: *Nov. 29, 2011

(54) MULTI-WAY SENSOR SWITCH

(75) Inventor: Jonathan Null, San Jose, CA (US)

(73) Assignee: The Watt Stopper Inc, Santa Clara, CA (US)

(*) Notice: Subject to any disclaimer, the term of this patent is extended or adjusted under 35 U.S.C. 154(b) by 250 days.

This patent is subject to a terminal disclaimer.

(21) Appl. No.: 12/287,808

(22) Filed: Oct. 14, 2008

(65) Prior Publication Data

US 2009/0072766 A1  Mar. 19, 2009

Related U.S. Application Data

(63) Continuation of application No. 11/701,282, filed on Jan. 31, 2007, now Pat. No. 7,436,132, which is a continuation-in-part of application No. 11/580,374, filed on Oct. 12, 2006, now Pat. No. 7,405,524, which is a continuation of application No. 11/084,449, filed on Mar. 18, 2005, now Pat. No. 7,122,976, which is a continuation-in-part of application No. 10/255,659, filed on Sep. 25, 2002, now Pat. No. 6,888,323.

(60) Provisional application No. 60/771,620, filed on Feb. 18, 2006.

(51) Int. Cl.
  *H05B 37/02* (2006.01)
(52) U.S. Cl. .......................... 315/361; 315/295; 315/312
(58) Field of Classification Search .................. 343/295, 343/312, 361
  See application file for complete search history.

(56) References Cited

U.S. PATENT DOCUMENTS

| 3,912,866 A | 10/1975 | Fox |
| 3,993,569 A | 11/1976 | Zinsmeyer et al. |
| 4,021,679 A | 5/1977 | Bolle et al. |
| 4,093,943 A | 6/1978 | Knight |
| 4,107,659 A | 8/1978 | Massa |
| 4,233,545 A | 11/1980 | Webster et al. |
| 4,330,706 A | 5/1982 | Lawenhaupt |
| 4,458,170 A | 7/1984 | Takayama et al. |
| 4,607,186 A | 8/1986 | Takayama et al. |
| 4,628,496 A | 12/1986 | Lee |

(Continued)

OTHER PUBLICATIONS

Vishay Telefunken, "Physics of Optoelectronic Devices Light-Emitting Diodes,"Dec. 1999, pp. J-7.

(Continued)

*Primary Examiner* — Douglas W Owens
*Assistant Examiner* — Chuc Tran
(74) *Attorney, Agent, or Firm* — JAG Patent Services LLC; James A. Gavney, Jr.

(57) ABSTRACT

A system for controlling a load circuit is disclosed. The system includes a plurality of multi-way sensor switches for mounting in an electrical boxes and coupling to the load circuit. Preferably, each of the multi-way sensor switches includes a tactile switch for manually opening and closing the load circuit load circuit, a built-in sensor for automatically opening and closing the load circuit in response to a level of detected motion and a micro-processor for generating status signals. The status signals are transmitted between each of the multi-way sensor switches over a traveler wire that is electrically coupled to each of the multi-way sensor switches. The micro-processor then uses the status signals to synchronize the operation of each of the multi-way sensor switches to allowing the multi-way sensor switches to operate in a true three-way fashion.

14 Claims, 7 Drawing Sheets

U.S. PATENT DOCUMENTS

| | | | |
|---|---|---|---|
| 4,695,769 A | 9/1987 | Schweickardt |
| 4,751,623 A | 6/1988 | Gaines et al. |
| 4,757,430 A | 7/1988 | Dubak et al. |
| 4,820,938 A | 4/1989 | Mix et al. |
| 4,914,859 A | 4/1990 | Gionet et al. |
| 5,015,994 A | 5/1991 | Hoberman et al. |
| 5,185,728 A | 2/1993 | Gilchrist |
| 5,189,393 A | 2/1993 | Hu |
| 5,251,188 A | 10/1993 | Parsons et al. |
| 5,307,051 A | 4/1994 | Sedlmayr |
| 5,386,210 A | 1/1995 | Lee |
| 5,406,173 A | 4/1995 | Mix et al. |
| 5,442,177 A | 8/1995 | Boulos et al. |
| 5,455,487 A | 10/1995 | Mix et al. |
| 5,475,360 A | 12/1995 | Guidette et al. |
| 5,489,827 A | 2/1996 | Xia |
| 5,495,402 A | 2/1996 | Houssian |
| 5,495,766 A | 3/1996 | Kota et al. |
| 5,638,824 A | 6/1997 | Summers |
| 5,640,143 A | 6/1997 | Myron et al. |
| 5,652,567 A | 7/1997 | Traxler |
| 5,668,446 A | 9/1997 | Baker |
| 5,699,243 A | 12/1997 | Eckel et al. |
| 5,701,058 A | 12/1997 | Roth |
| 5,713,655 A | 2/1998 | Blackman |
| D393,912 S | 4/1998 | Yuen |
| 5,753,983 A | 5/1998 | Dickie et al. |
| 5,763,872 A | 6/1998 | Ness |
| 5,867,099 A | 2/1999 | Keeter |
| D409,317 S | 5/1999 | Yuen |
| 5,932,861 A | 8/1999 | Iwaguchi et al. |
| 5,946,209 A | 8/1999 | Eckel et al. |
| 5,984,513 A | 11/1999 | Baldwin |
| 6,051,787 A | 4/2000 | Rintz |
| D425,222 S | 5/2000 | Yuen |
| D425,638 S | 5/2000 | Yuen |
| 6,084,231 A | 7/2000 | Popat |
| 6,087,588 A | 7/2000 | Soules |
| 6,087,760 A | 7/2000 | Yamaguchi et al. |
| D431,660 S | 10/2000 | Yuen |
| 6,132,057 A | 10/2000 | Williams |
| 6,138,241 A | 10/2000 | Eckel et al. |
| 6,151,529 A | 11/2000 | Batko |
| 6,172,301 B1 | 1/2001 | Goodsell |
| RE37,135 E | 4/2001 | Elwell |
| 6,337,541 B1 | 1/2002 | Dickie et al. |
| 6,343,134 B1 | 1/2002 | Czerwinski |
| 6,390,647 B1 | 5/2002 | Shafer |
| 6,466,826 B1 | 10/2002 | Nishihira |
| 6,566,882 B2 | 5/2003 | Baldwin et al. |
| 6,583,573 B2 | 6/2003 | Bierman |
| 6,693,527 B2 | 2/2004 | Bone |
| 6,798,341 B1 | 9/2004 | Eckel et al. |
| 6,909,239 B2 | 6/2005 | Gauna |
| 7,122,976 B1 | 10/2006 | Null et al. |
| 7,436,132 B1 * | 10/2008 | Null ............................ 315/312 |

OTHER PUBLICATIONS

Vishay Telefunken, "Measuring Technique," Dec. 1999, pp. 1-9.

D.K. Kahaner, Asian Technology Infonnation Program (ATIP), "ATIp95.59: Blue LED's: Breakthroughs and Implications," ATIP Report, Aug. 27, 1995, See www.cs.arizona.edu/japan/atip/public/atip.reports.95/atip95.59r.html.

Sam Berman, Energy User News, "The Coming Revolution in Lighting Practice," Oct. 2000, pp. 24-26.

IESNA Paper #59, "Characterizing Daylight Photosensor System Performance to Help Overcome Market Barriers," by Andrew Bierman et al.

Journal of the Illuminating Engineering Society, "Improving the Performance of Photo-Electrically Controlled Lighting Systems," by Francis Rubinstein et al., Winter 1989, pp. 70-94.

Specifier Reports, "Photosensors-Lightsensing devices that control output from electric lighting systems", National Light Product Information Program, vol. 6 No. 1, Mar. 1998, p. 1 of 20.

"Si Photodiode-S7686", Hamamatsu, pp. 1.

"Si Photodiodes-S6626, S6838", Hamamatsu, pp. 1-2; and.

"Si Photodiodes-S7160, S7160-01", Hamamatsu, pp. 1-2.

"Energy Efficient & Customer Research & Development Technology Brief . . . Smart Vanity Lighting System", SMUD, 2 pages.

"Customer Advanced Technologies ", www.smud.org/education/cat/index.html, 3 pages; and.

SensorLite WSD-NL, Sensor Switch, Inc. Jan. 18, 2005, 2 pages.

* cited by examiner

The signal voltage Vpeak=120V

MULTI-WAY SENSOR SWITCH

RELATED APPLICATION(S)

This application is a Continuation Application of the application Ser. No. 11/701,282, filed Jan. 31, 2007, now U.S. Pat. No. 7,436,132, which is a Continuation-in-Part application Serial No. Ser. No. 11/580,374, entitled "LIGHT MANAGEMENT SYSTEM DEVICE AND METHOD," filed Oct. 12, 2006, now U.S. Pat. No. 7,405,524, which is a Continuation Application of the co-pending application Ser. No. 11/084,449, entitled "LIGHT MANAGEMENT SYSTEM DEVICE AND METHOD," filed Mar. 18, 2005, now U.S. Pat. No. 7,122,976, which is a Continuation-in-Part Application of the co-pending application Ser. No. 10/255,659, entitled "LIGHT MANAGEMENT SYSTEM DEVICE AND METHOD," filed Sep. 25, 2002, now U.S. Pat. No. 6,888,323. This Application also claims priority under 35 U.S.C. § 119(e) from the U.S. Provisional Patent Application Ser. No. 60/771,620, filed on Feb. 18, 2006, and titled "MULTI-WAY SENSOR SWITCH." The U.S. Pat. Nos. 7,436,132, 7,405,524, 7,122,976, and 6,88,323 and the U.S. Provisional Patent Application Ser. No. 60/771,620 are all hereby incorporated by reference.

FIELD OF THE INVENTION

This invention relates to light management systems, devices and method. More particularly, the present invention relates to light management systems and devices for and methods of automatically and manually controlling a load circuit with room lights.

BACKGROUND OF THE INVENTION

A number of different light management systems are known. One type of light management system utilizes a motion detector or sensor. In such systems, room lights are turned off, turned on and/or are dimmed according to a detected level of motion within the room.

There is a continual push to reduce energy consumption, because of rising energy costs and negative environmental impacts of energy usage and energy generation. Therefore, there is a need for improved light management systems, devices and methods which help to conserve energy.

SUMMARY OF THE INVENTION

Three-way tactile light switches are typically used to operate a load circuit from two locations. For example, three-way tactile switches located at two locations are used to operate lights from the top and the bottom of a stairwell, along a corridor of a hallway or at two locations in a large room. It is difficult to adapt sensors and sensor technology to be used in three-way applications for several reasons. In normal three-way tactile switches, when one switch is opened, power is lost to both switches and when one switch is closed, power is provided to both switches. Such a configuration will not work for three-way sensor applications because unlike three-way tactile switches, sensors require a continuous supervisory current to power the sensor unit such that the sensor can continuously monitor an area for motion, light level or whatever element or condition the sensor is designed to monitor. Also, unlike three-way tactile switches, in order for sensors to operate in a "true three-way fashion," the sensors need to be synchronized, such that the sensors coordinate modes or operation. In other words, each sensor needs to know what the other sensor is detecting. For example, if a set of three-way motion sensor switches is not synchronized, then a first sensor may shut off the lights along a hall hallway or a large room while a person is still in the hall way or the large room in the proximity of the second sensor. Multi-way sensor switches of the present invention can utilize wireless radio transmitters and receivers for communicating modes or operation or status between each other. However, radio transmitters and receivers can be difficult to program or commission in a residential setting and they tend to be expensive to manufacture.

To address the aforementioned shortcomings, the present invention is directed to multi-way sensor switches and multi-way sensor switch systems for controlling load circuits. The term "multi-way sensor switch" is used herein to denote that a system of the present invention can include any number of multi-way sensor switches that each operates or controls the same load circuit. For example, a long hallway can use four or more multi-way sensor switches of the present invention that operate in a synchronized fashion to control lighting within the hallway corridor.

In accordance with the embodiments of the invention, each of the multi-way sensor switches includes three or more connections. At least two of the connections are used to couple to a load circuit for opening and closing the load circuit and for providing a supervisory current to the sensor. At least one of the connections is a traveler connection that is used to provide a communication path between the multi-way sensor switches. The communication path is a wire bus that supports a communication protocol that allows the sensors in each of the multi-way sensor switches to communicate and synchronize operations.

In accordance with the embodiment of the invention a first multi-way sensor switch includes a first tactile switch for operating the load circuit from a first location. The first multi-way sensor switch also includes a first built-in sensor for automatically operating the load circuit in response to detected motion in the vicinity of the first location. The system also includes a second multi-way sensor switch. The second multi-way sensor switch preferably includes a second tactile switch for manually operating the load circuit from a second location and a second built-in sensor for automatically operating the load circuit in response to detected motion in the vicinity of the second location.

The first and second tactile switches are configured to operate the load circuit in a three way fashion as described above. Also, the first and the second sensors are supplied with a supervisory current and are configured to automatically operate the load circuit in a three-way fashion or multi-way fashion. Preferably, in an automatic mode, the sensors turn on the lights when motion is detected. After a selected or fixed period of time that both the first and second sensor do not detect motion, the load circuit is open and the lights are shut off or dimmed by one or more of the multi-way sensor switches.

Preferably, all of the multi-way sensor switches are coupled together through their respective travel connections by a travel wire, wherein a micro-processor built into each of the multi-way sensor switches communicates the status of each multi-way sensor switches to the other multi-way sensor switches coupled to the same load circuit and allows each multi-way sensor switch to operate in a synchronized fashion, such as described in detail above.

The manual switch of each of the multi-way sensor switch is preferably a momentary switch, which herein describes a touch switch that is depressed to change the operation of the switch unit and then returns to its original position. However, it is understood that any other type of switch for manually controlling the room light through the load circuit, such as a rheostat, a toggle, or a flip switch are considered to be within the scope of the present invention.

Multi-way sensor switches in accordance with further embodiments of the invention includes a light unit, also referred to herein as a night light, for emitting low level room light when the manual switch opens the load circuit to turn the room light off, or when current that is drawn through the load circuit reaches a predetermined value.

In a preferred embodiment of the invention, the multi-way sensor switch has a motion sensor, wherein the motion sensor is configured to instruct the multi-way sensor switch to adjust room lighting by adjusting the level of light emitting from the room light, the night light or both, based on a level of detected motion within an area around the multi-way sensor switch. For example, when no motion is detected by the motion sensor in the area around the multi-way sensor switch, then the sensor, after a time delay, instructs the multi-way sensor switch to dim the room light, dim the night light, shut the room light off, shut the night light off or a combination thereof. Likewise, when the motion detector detects motion within the area around the multi-way sensor switch, then the motion sensor instructs the multi-way sensor switch to increase the level of room lighting by turning the room light on, turning the night light on, brightening the room light, brightening the night light or a combination thereof.

Preferably, the multi-way sensor switch has a micro-processor for programming modes of operation, including setting the time delay value for when the room light and/or night light are shut off or dimmed in the absence of detected motion. Preferably, the micro-processor is programmable through an internal DIP switch, the manual switch or a combination thereof. For example, during the installation of the multi-way sensor switch, a technician actuates the internal DIP switch to place the multi-way sensor switch in program mode. Then the technician can toggle through options, including automatic operation or manual operation of the room light and automatic or manual operation of the night light. In yet further embodiments, the multi-way sensor switch is programmable to have the room lights and/or the night light turn on and/or off based on the time of day. For example, the multi-way sensor switch is programmable to have the night light capabilities only during the hours of 6:00 PM to 6:00 AM.

In a preferred embodiment of the invention, the manual switch of the multi-way sensor switch is a momentary switch with the night light and the motion detector integrated into the momentary switch. The motion sensor is preferably an infra-red motion sensor and the night light preferably comprises light emitting diodes (LEDs). In this preferred embodiment, dimming the night light is accomplished by providing a pulsed current to the LEDs, such that the LEDs shut on and off to give an apparent dimming effect. Alternatively, or in addition to providing a pulsed current, dimming the night light is accomplished by disabling one or more of the light-emitting diodes.

In accordance with still further embodiments of the invention, the multi-way sensor switch has a light detector for measuring a level of room lighting. The light sensor is preferably configured to turn on, turn off, and/or dim the room light and/or the night light based on a level of detected room lighting. For example, if the load circuit is open and the night light is on, when the light sensor detects that there is a sufficient level of room lighting coming from, for example sun light or from lights in adjacent room(s), then the light sensor instructs the multi-way sensor switch to turn the night light off, turn the room light off, dim the room light or any combination thereof.

In accordance with further embodiments of the invention, a lighting control system includes a control module. The control module is electrically coupled to a load circuit for controlling and powering outdoor lights. The control module includes a night light unit with a night light source, which can be an LED light source, an incandescent light source, a fluorescent light source, a halogen light source or any combination thereof. The night light unit and the light source are controlled using or more sensor units, such as a light sensor unit and/or a motion sensor unit.

In accordance with the embodiments of the invention, the lighting control system can also be turned on and off and/or controlled through one or manual switches. For example, a manual switch on the control module can be used to turn on and off and/or control the lighting control system. Alternatively, or in addition to the manual switch on the control module, the lighting control system can include an in-line manual switch that is electrically coupled to the control module thorough the load circuit. The in-line manual switch can be configured to turn on and off the outdoor lights and can also be configured to select a mode of operation of the lighting control system, such as described below.

In operation, the control module is configured to open and close the load circuit in response to control signals generated by the one or more sensor units. The lighting control system can be configured to automatically turn on at a selected time and/or in response to outdoor lighting conditions in an area corresponding to the control module. For example, the lighting control system can be configured to automatically turn on and go into a night light mode from the hours of 6 PM to 6 AM and/or when the light sensor unit detects light levels that are below a preset or selected threshold value. In the night light operating mode, the night light unit powers the night light source at the selected or programmed time and/or when the light levels detected by the light sensor unit are below the threshold value. The motion sensor monitors motion in an area corresponding to the motion sensor unit. When the motion sensor unit detects motion above a threshold level, the motion sensor unit generates control signals that instruct the night light unit to shut off the night light source and the control module to close the load circuit and turn on the outdoor lights. Preferably, the outdoor lights are configured to illuminate an area 10 corresponding to a location where the motion is detected. After a duration of time that motion is either not detected or motion is detected at levels below the threshold level by the motion sensor unit, the motion sensor unit generates control signals that instruct the control module to open the load circuit and shut off the outdoor lights, and simultaneously instructs the night light unit to turn on the night light source.

In accordance with the embodiments of the invention, the lighting control system can be programmed in any number of different ways. For example, the lighting control system has a micro-processor with a user interface, such as a keyboard and/or a micro-switch that allow a user to select and set various parameters, programs and/or modes of operation, such as the time when the lighting control system turns on and goes into night light operation mode and the duration of time that the outdoor light remains on after motion is detected by the motion sensor unit. In accordance with further embodiments of the invention, the mode of operation of the lighting control system can be selected with the in-line manual switch. For example, moving the in-line manual switch through a plurality of off/on sequences within a predetermined duration of (e.g., 2 seconds), the lighting control system can be configured to go into an override mode, whereby control signals from the one or more sensor units are ignored or blocked and the control module keeps the load circuit closed and the outdoor lights on for a predetermined duration of time (e.g., 4 hours). After the outdoor lights have stayed on for the predetermined period of time, the lighting control system then reverts to night light operation mode, such as previously described. The in-line manual switch and/or the control module can also be equipped with an indicator means, such as one or more LED lights, that flashes, displays or otherwise indicates the mode of operation of the lighting control system.

DETAILED DESCRIPTION OF THE INVENTION

Figure 1A:
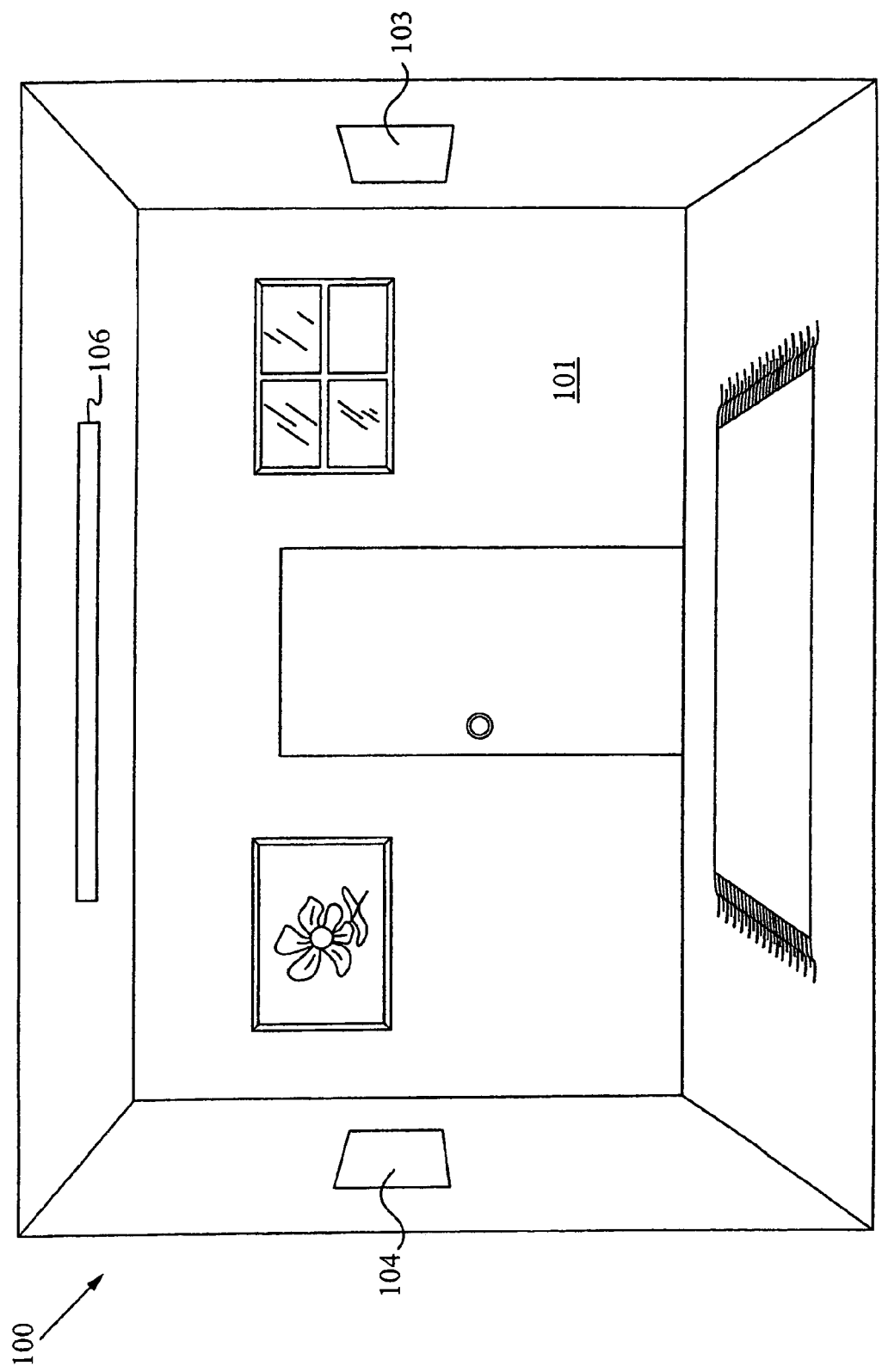
FIG. 1A shows a perspective view of a room with multi-way sensor switches that each include a motion sensor and a manual switch for controlling a room light, in accordance with the embodiments of the invention.

FIG. 1 shows a perspective view of a room 100 with a light management system, in accordance with the embodiments of the present invention. The light management system 100 is configured to control one or more lights 106 based on occupation of the room. The light management system includes multi-way sensor switches 103 and 104 that couple to a load circuit (not shown) that provide power for the one or more room lights 106.

Each of the multi-way sensor switches 103 and 104 include a motion sensor for sensing the presence of a person (not shown) within the room 101 and automatically controlling the one or more room lights 106 in response to a level of detected motion. Each of the multi-way sensor 10 switches also includes a manual switch for manually controlling the one or more room light 106.

Figure 1B:
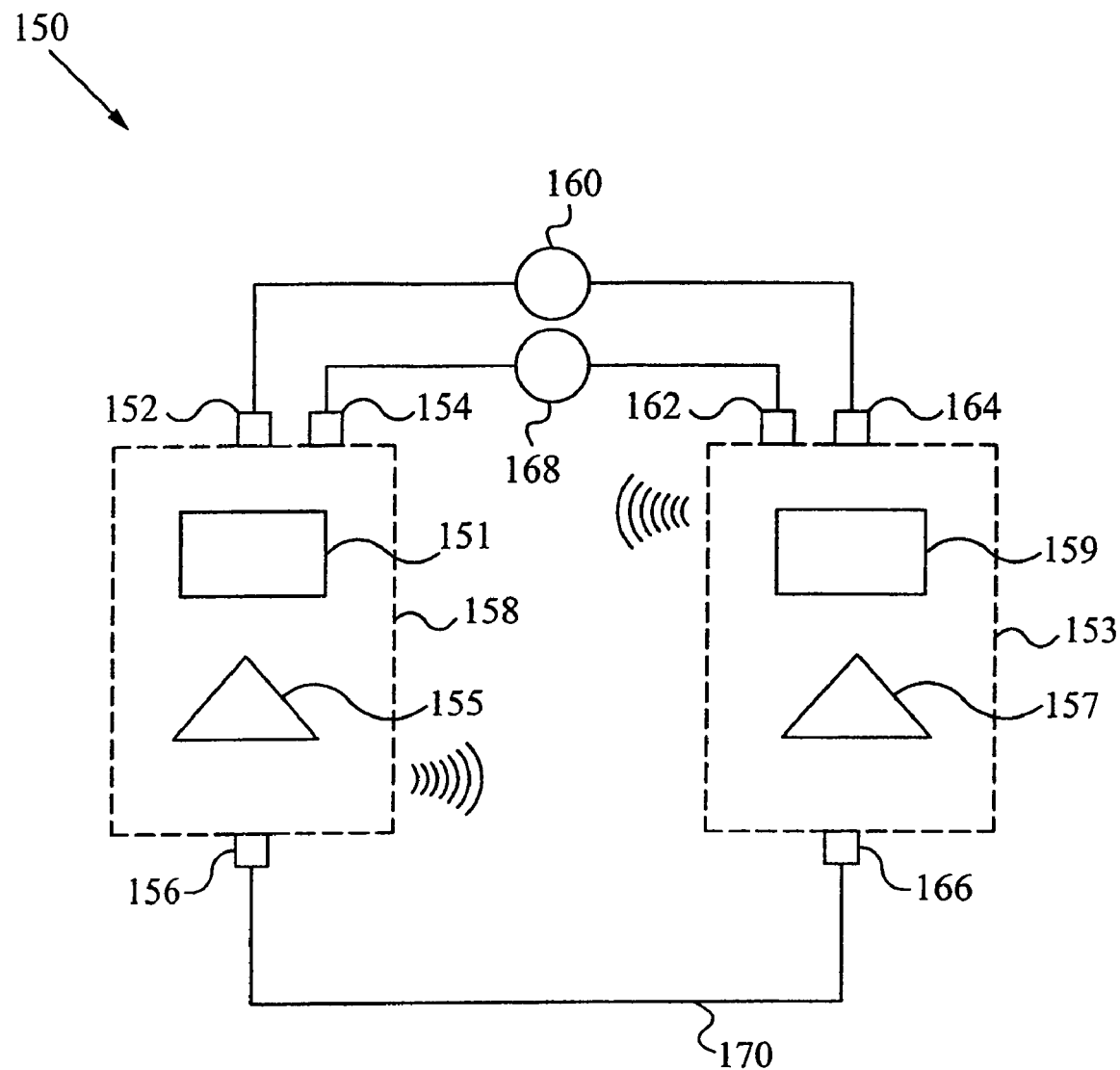
FIG. 1B shows a schematic block diagram of a light management system, in accordance with the embodiments of the invention.

FIG. 1B shows a schematic block diagram of a light management system 150, in accordance with the embodiments of the invention. The system 150 includes a first switch unit 158 for electrically coupling to the load circuit 161, 163 and 168 through a first electrical switch box (not shown). The first switch unit 158 is electrically coupling to the load circuit 161, 163 and 168 through at least two connectors 152 and 154. The first switch unit 158 includes a first tactile switch 151 for operating the load circuit 161, 163 and 168 from a first location and a first built-in sensor 155 for automatically operating the load circuit 161, 163 and 168 in response to detected motion in the first location. The first built-in sensor 155 is provided with supervisory power through the connection 152 and 154.

Still referring FIG. 1B, the system 150 further includes a second switch unit 153 for electrically coupling to the load circuits 160 and 168 through a second electrical switch box (not shown). The second switch unit 158 is electrically coupling to the load circuits 160 and 168 through at least to connectors 162 and 164. The second switch unit 153 includes a second tactile switch 159 for operating the load circuits 160 and 168 from a first location and a second built-in sensor 157 for automatically operating the load circuits 160 and 168 in response to detected motion in the second location. The second built-in sensor 157 is provided with supervisory power through the connections 162 and 164.

In accordance with the embodiments of the invention, the first and second switch units 158/153 are electrically coupled through a traveler wire 170 that is connected to each of the first and second switch units 158/153 through traveler leads 156 and 166, respectively. As described above the switch units 158/153 each include a micro-processor (not shown) for generating status signals that are transmitted over the traveler wire according to a communication protocol, such as shown in FIG. 5B, wherein the operation of the first and second built-in sensors is synchronized.

Figure 2:
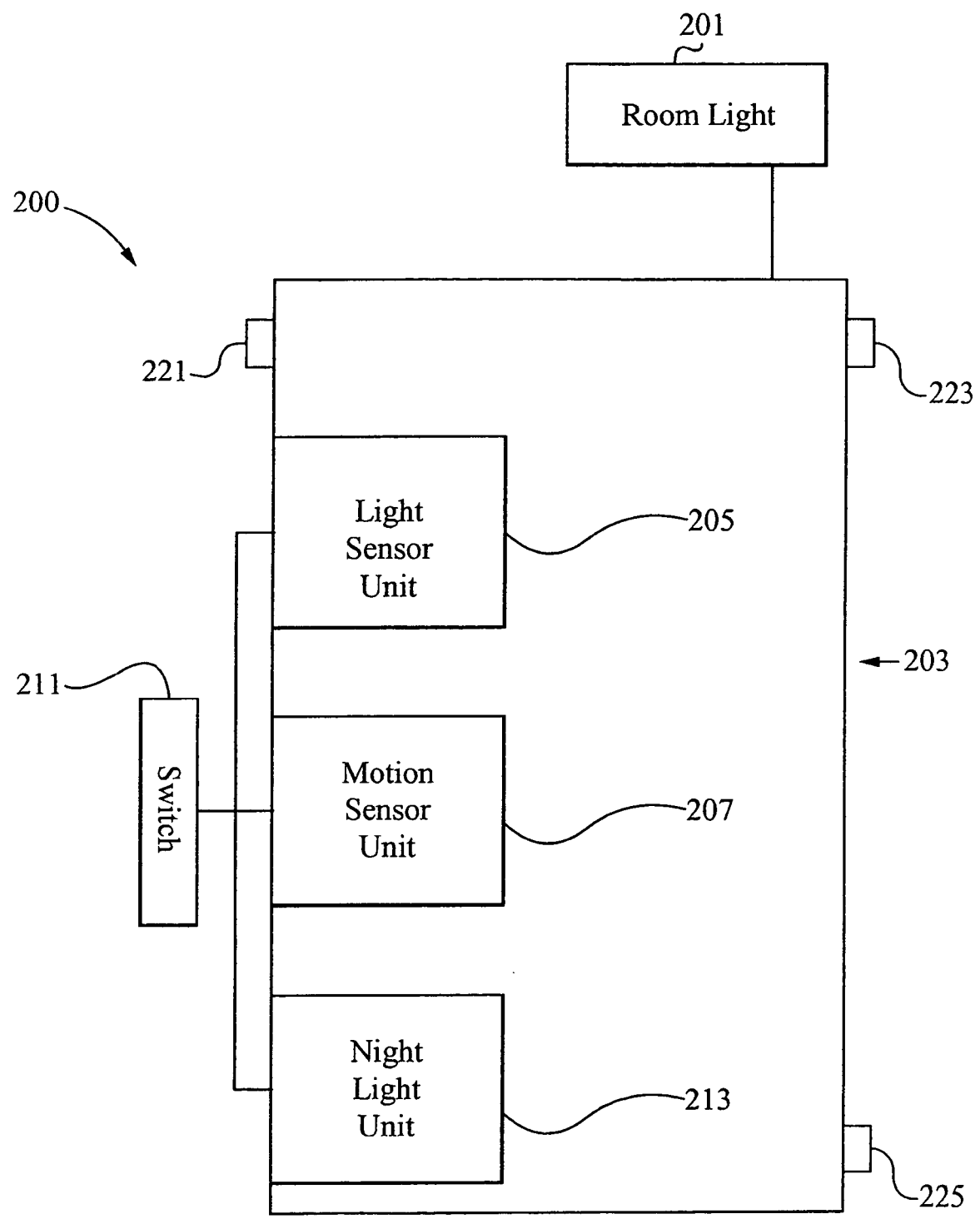
FIG. 2 shows a schematic block diagram of a multi-way sensor light switch, in accordance with the embodiments of the invention.

Now referring to FIG. 2, a light management system 200 in accordance with the embodiments of the present invention, preferably comprises a housing unit 203, for coupling to the wall receptacle and a manual wall switch 211 for manually operating a room light 201, such as an overhead light fixture or a wall light fixture. The system 200 preferably further comprises a night light unit 213, such as a night light, configured to provide reduced or low level room lighting when the room light 201 is off. In addition to the manual switch 211 and the night light unit 213, the system 200 preferably comprises a sensor 207 that is configured to operate or adjust room light 201 and/or the night light unit 213 based on a detected occupancy of the room. Preferably, the sensor 207 is a motion sensor configured to operate or adjust the room light 210 20 and/or the night light unit 213 based on a level of detected motion within the room, or a lack thereof, as explained in detail below.

Still referring to FIG. 2, the system 200, in accordance with further embodiments of the invention, comprises a light sensor unit 205. The light sensor unit 205 is configured to detect a level of room lighting and adjust the room light 201 and/or night light unit 213 based on a level of detected room lighting. The manual switch 211, the night light unit 213, the motion sensor unit 207 and the light sensor unit 205 are integrated to operate collectively in a number of different ways to provide a wide range of modes of operation suitable for a variety of applications. For example, the light sensor unit 205, in accordance with the embodiments of the invention, is configured to override the motion sensor unit 207, such that the room light 210 and/or the night light unit 213 are disabled when there is a sufficient level of room lighting, regardless of whether the room is occupied or not. Accordingly, modes of operation described below are for illustration only and any number of different modes of operation are considered to be within the scope of the present invention.

Figure 3:
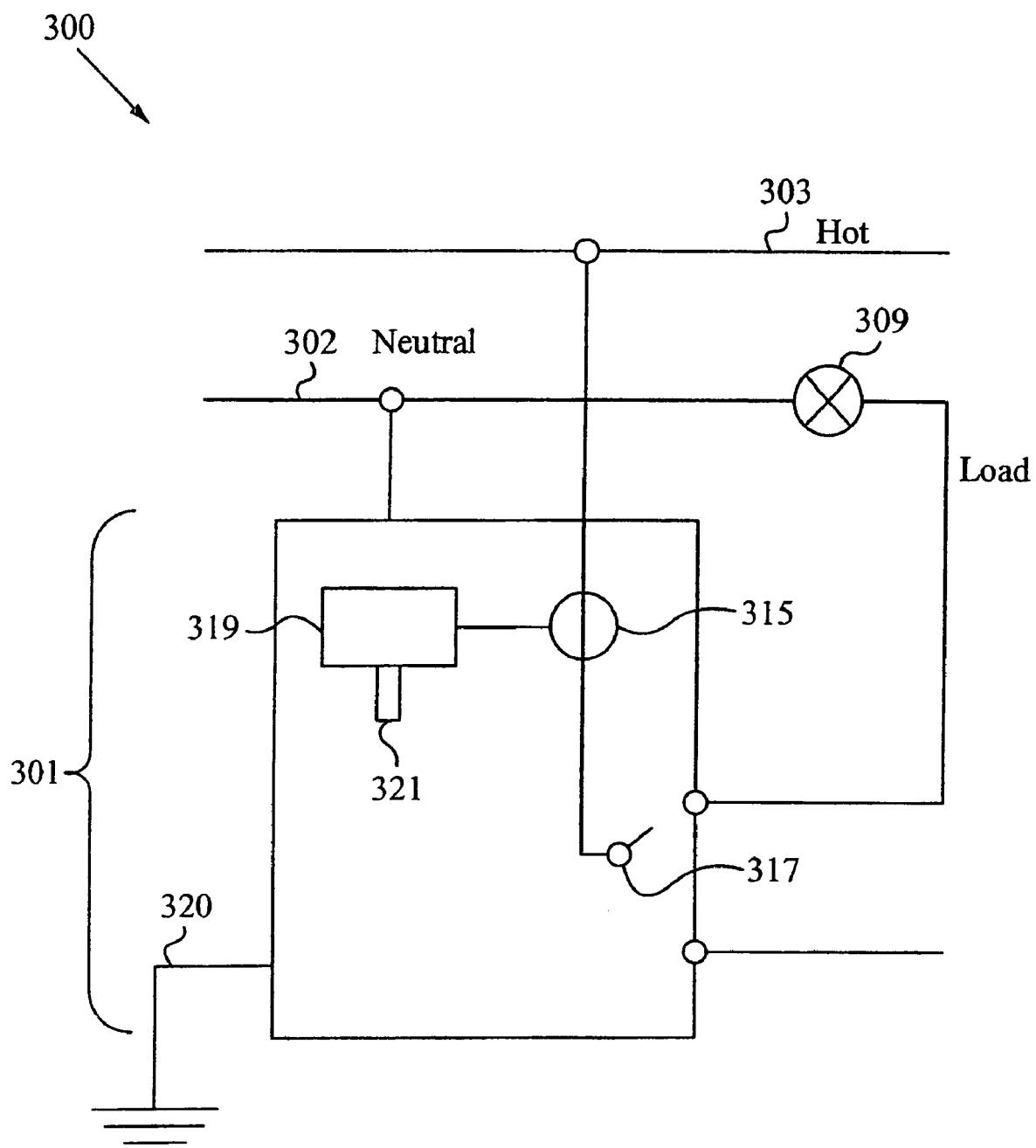
FIG. 3 is a schematic wiring diagram of a light management system, in accordance with the embodiments of the invention.

FIG. 3 shows a schematic wiring diagram of a load circuit 300 with a control system 301, in accordance with the embodiments of the present invention. The control system 301 comprises one or more control units 315 in communication with a circuit switch 317. The control units 315 are configured to open and close the circuit switch 317. Preferably, the control unit 315 includes an infrared motion sensor for detecting motion and for opening and closing the circuit switch 317 based on a level of detected motion. The control unit 315, in accordance with further embodiments of the invention, includes a light sensor, as described above.

The system 301 is coupled to an electrical ground lead 320. The circuit switch 317 is coupled to a neutral lead 302 and a hot lead 303 through the control unit 315, with a load device 309 therebetween, as shown. When the circuit switch 317 is closed current is then drawn 20 through the load device 309 to operate the load device 309. The load device 309 is preferably a light fixture for lighting a room.

Still referring to FIG. 3, the system 301 also preferably has a microprocessor 319 is configured with firmware which allows a user to select modes of operation with a dip switch 321. In accordance with further embodiments of the invention, the micro-processor is coupled to a momentary switch (not shown) which allows the user to select system features within a given mode of operation. For example, the system 310 is configured to allow the user to place the system 301 in program mode by pushing the momentary switch down and holding the momentary switch down for period of time. With the system 301 in program mode, the user programs the light unit (not shown) to shut off in response to ambient light and/or adjusts the level of light emitted by the light unit. When the light unit comprises LEDs, selecting the level of light emitted by the light unit comprises enabling or disabling one or more of the LEDs.

Figure 4A:
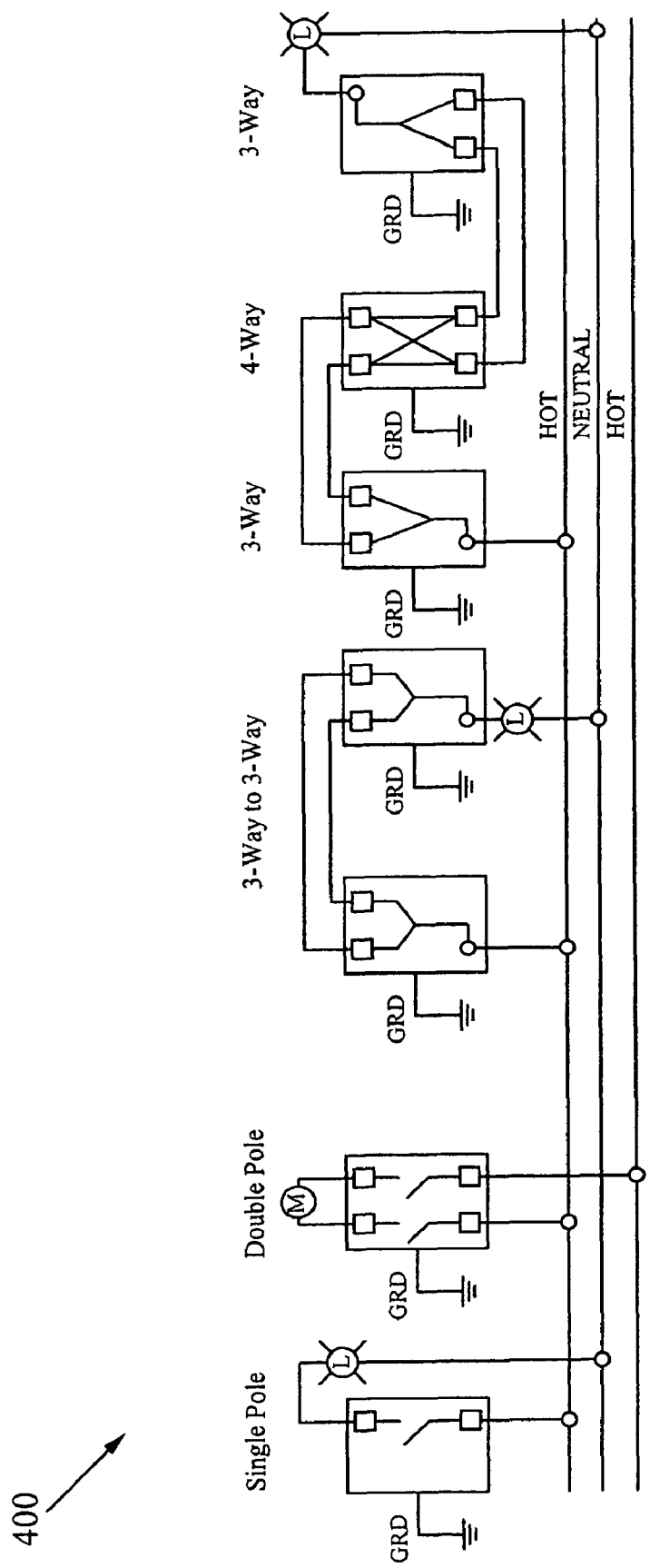
FIGS. 4A-B show schematic wiring diagram of multi-way sensor switches, in accordance with the embodiments of the invention.
Figure 4B:
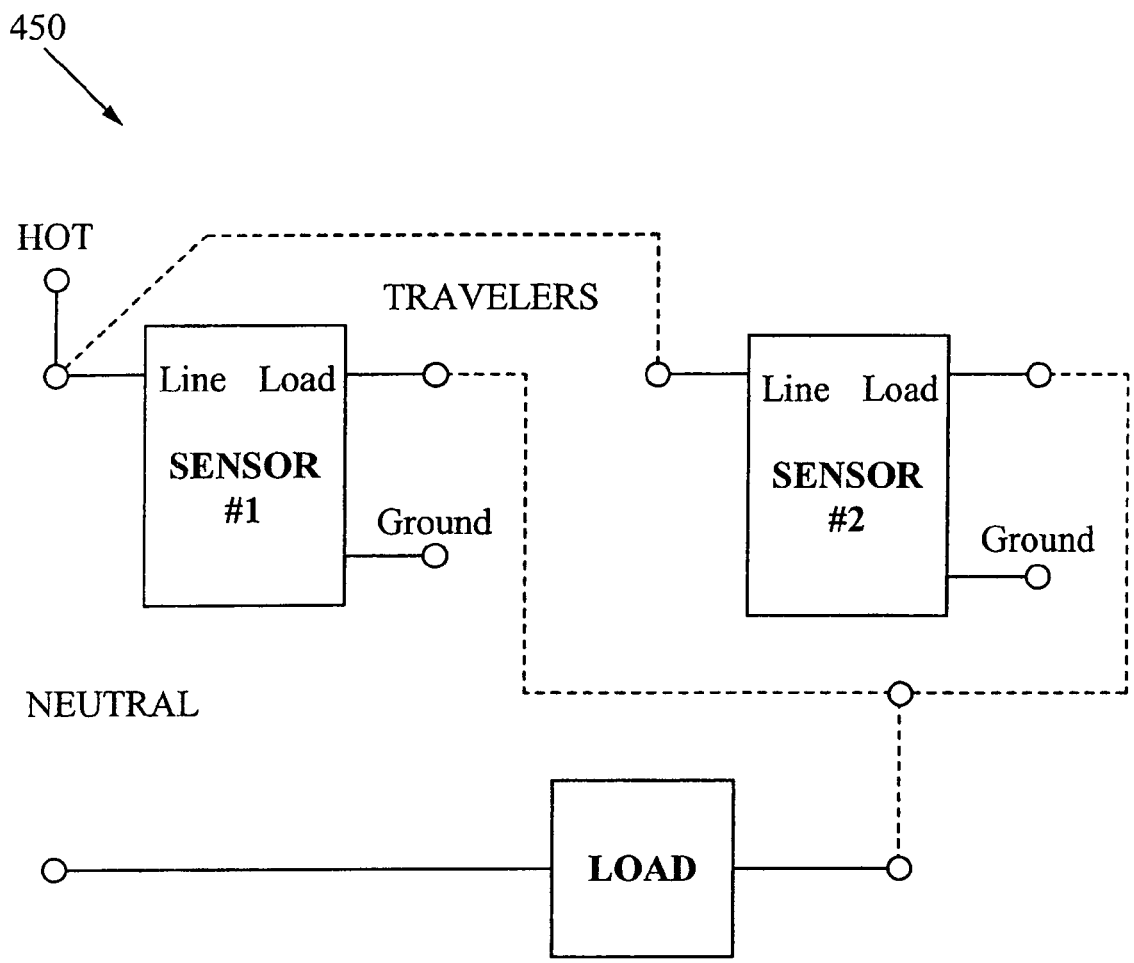

FIG. 4A-B show schematic wiring diagram of multi-way sensor switches, in accordance with the embodiments of the invention.

Figure 5A:
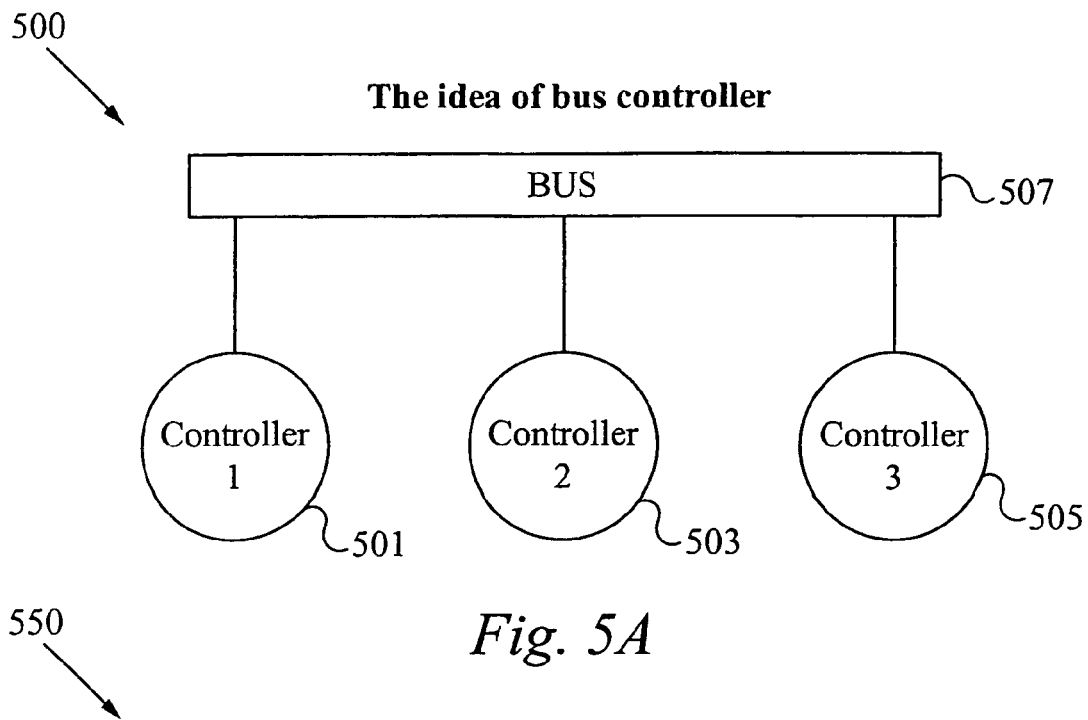
FIG. 5A is a block diagram of a multi-way sensor coupled through a bus, in accordance with the embodiments of the invention.
Figure 5B:
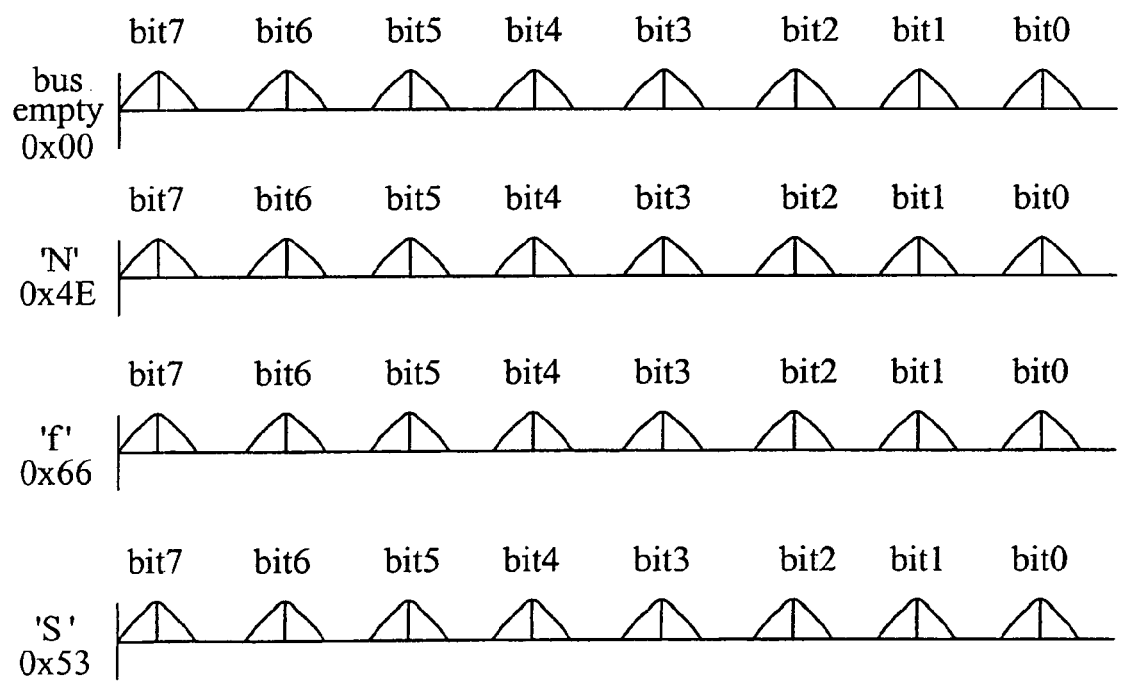
FIG. 5B shows a schematic representation of a data stream for synchronizing sensor over a bus, in accordance with the embodiments of the invention.

FIG. 5A is a block diagram of a multi-way sensor coupled through a bus, in accordance with the embodiments of the invention.

FIG. 5B shows a schematic representation of a data stream for synchronizing sensor over a bus, in accordance with the embodiments of the invention.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A control system for controlling lighting, the system comprising multi-way sensor switches for mounting in electrical boxes and coupling to a load circuit, each of the multi-way sensor switches comprising:
a) tactile switch for manually opening and closing the load circuit; wherein the system is programmable through the tactile switch;
b) built-in motion sensor for automatically opening and closing the load circuit in response to detected motion;
c) a micro-processor for generating status signals;
d) at least two connectors for coupling to the load circuit and for providing power to the built-in motion sensor;
e) means for transmitting the status signals between each of the multi-way sensor switches and synchronizing operation of each of the multi-way sensor switches; and
f) a light sensor for measuring light levels and wherein the multi-way sensor switches automatically turn on a night light when the light levels measured by the light sensor are below a threshold value and the load circuits opened.

2. The control system of claim 1, wherein the multi-way sensor switch further includes a light sensor for measuring light levels and wherein the multi-way sensor automatically turn on a night light when the light levels measured by the light sensor are below a threshold value and the load circuits opened.

3. The control system of claim 2, wherein the light sensor comprises a photo-diode.

4. The control system of claim 2, wherein the night light is built-in to the multi-way sensor switch and is placed in a night light mode through the tactile switch.

5. The control system of claim 2, wherein the night light comprises a light emitting diode.

6. The control system of claim 1, wherein the motion sensor comprises an infrared sensor.

7. The control system of claim 1, wherein the means for transmitting the status signals between each of the multi-way sensor switches and synchronizing operation of each of the multi-way sensor switches includes at least one travel connection coupled to a travel wire.

8. A system for controlling a load circuit, the system comprising:
a) a first switch unit for electrically coupling to the load circuit through a first electrical switch box, the a first switch unit comprising:
I) a first tactile switch for operating the load circuit from a first location; and
ii) a first built-in sensor for automatically operating the load circuit in response to detected motion in the first location; and
b) a second switch unit for electrically coupling to the load circuit through a second electrical switch box, the a second switch unit comprising:
I) a second tactile switch for operating the load circuit from a second location; and
ii) a second built-in sensor for automatically operating the load circuit in response to detected motion in the second location; wherein at least one of the first and the second switch units includes means for selecting and programming a duration of time that the load circuit remains closed after levels of motion detected by either of the first built-in sensor or second built-in sensor detected are below a threshold value; and
c) a traveler wire connecting the first switch unit and the second switch unit through traveler leads, wherein the operation of the first and second built-in sensors is synchronized through the traveler wire.

9. The system of claim 8, wherein the load circuit is couple one or more lights.

10. The system of claim 8, wherein at least one of the first and the second switch units includes a built-in night light that emits light when the load circuit is in an opened position.

11. The system of claim 8, wherein at least one of the first and the second switch units includes a light sensor for detecting levels of ambient light and automatically controlling the built-in night light based on the levels of detected ambient light.

12. The system of claim 8, wherein the means for selecting and programming the duration of time includes a micro-processor.

13. The system of claim 8, wherein the motion sensor comprises an infrared sensor.

14. A method of controlling a load circuit comprising:
a) coupling a plurality of multi-way sensor switches to the load circuit, each comprising:
I) tactile switch for manually opening and closing the load circuit load circuit
ii) built-in sensor for automatically opening and closing the load circuit in response to detected motion;

iii) a micro-processor for generating status signals;
iv) at least two connectors for coupling to the load circuit and for providing supervisor power to the built in motion sensor; and
v) at least one travel connection;
b) coupling each of the sensor switches to a traveler wire through the traveler connections; and
c) and transmitting status signals between each of the multi-way sensor switches to Synchronize modes of operation; and programming the load circuit through the tactile switch.

* * * * *